(12) United States Patent
Liu et al.

(10) Patent No.: US 8,584,999 B2
(45) Date of Patent: Nov. 19, 2013

(54) RETAINING MECHANISM FOR DATA STORAGE DEVICE

(75) Inventors: Chih-Li Liu, New Taipei (TW); Yung-Lung Liu, New Taipei (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 13/340,598

(22) Filed: Dec. 29, 2011

(65) Prior Publication Data
US 2013/0048813 A1 Feb. 28, 2013

(30) Foreign Application Priority Data

Aug. 24, 2011 (CN) .................. 2011 2 0309462 U (51) Int. Cl.
*A47B 96/00* (2006.01)
(52) U.S. Cl.
USPC ............. 248/222.12; 248/225.11; 248/316.7; 361/679.37
(58) Field of Classification Search
USPC ............ 248/222.11, 222.12, 223.41, 224.61, 248/225.11, 311.2, 314, 316.7; 24/297; 361/697.34, 697.33, 726, 732, 679.34, 361/679.33, 679.35, 679.36, 679.37, 361/679.38, 679.39; 312/223.1, 223.2
See application file for complete search history.

(56) References Cited

U.S. PATENT DOCUMENTS

| | | | | |
|---|---|---|---|---|
| 3,700,206 A | * | 10/1972 | Jones ............................. | 251/84 |
| 4,566,660 A | * | 1/1986 | Anscher et al. .............. | 248/74.2 |
| 4,614,321 A | * | 9/1986 | Andre .......................... | 248/74.2 |
| 5,622,296 A | * | 4/1997 | Pirhonen et al. .............. | 224/197 |
| 6,280,116 B1 | * | 8/2001 | Szu ............................. | 403/408.1 |
| 6,336,768 B1 | * | 1/2002 | Kraus ......................... | 403/408.1 |
| 6,484,370 B2 | * | 11/2002 | Kanie et al. ..................... | 24/297 |
| 6,525,933 B2 | * | 2/2003 | Eland ....................... | 361/679.42 |
| 6,594,870 B1 | * | 7/2003 | Lambrecht et al. ............. | 24/297 |
| 7,178,855 B2 | * | 2/2007 | Catron et al. .............. | 296/146.7 |
| 7,188,815 B2 | * | 3/2007 | Peterson .................... | 248/316.7 |
| 7,369,402 B2 | * | 5/2008 | Huang ..................... | 361/679.33 |
| 7,995,337 B2 | * | 8/2011 | Kuo .......................... | 361/679.34 |
| 8,264,833 B2 | * | 9/2012 | Fang et al. .............. | 361/679.34 |
| 2004/0083583 A1 | * | 5/2004 | Bradley et al. .................. | 24/297 |
| 2005/0206058 A1 | * | 9/2005 | Masterson et al. ............ | 267/293 |
| 2010/0039766 A1 | * | 2/2010 | Chiang et al. ............ | 361/679.34 |

* cited by examiner

*Primary Examiner* — Terrell McKinnon
*Assistant Examiner* — Eret McNichols
(74) *Attorney, Agent, or Firm* — Li & Cai Intellectual Property (USA) Office (57) ABSTRACT

This invention relates to a retaining mechanism adapted for securing a data storage device having sides formed with a plurality of mounting holes. The retaining mechanism includes a securing structure and a retainer. The securing structure includes a wall body, an accommodating hole formed through the wall body, and a pair of elastic arms extending from the wall body into the accommodating hole. Each elastic arm has a fixed end connected to the corresponding inner surface of the accommodating hole and a free end extending inclined and downwardly toward a bottom of the accommodating hole. The retainer has one end engaging one of the mounting holes in the data storage device and the other end pressed by the elastic arms, and is secured in the securing structure. The retaining mechanism can be used as a snap-in bracket or a frame for quick replacement of the data storage device.

16 Claims, 8 Drawing Sheets

RETAINING MECHANISM FOR DATA STORAGE DEVICE

FIELD OF THE INVENTION

This invention relates to a retaining mechanism, and more particularly to a retaining mechanism that is able to quickly dismount a data storage device therefrom without a screwdriver, and can be applied in a snap-in bracket and a frame having the same.

DESCRIPTION OF RELATED ART

In a conventional computer includes data storage devices such as optical disc drives and hard disc drives. For quick installation of these devices into computer housing, mounting screws or other fixing means are typically used.

While the screws are used in data storage devices, multiple screws are required and a screwdriver is needed. Such method is tedious and time-consuming Since the screws are relatively small, there is a potential of loosing the screws. The other disadvantage is preparing a tool to drive the screws.

Moreover, other fixing means involve reducing the number of screws or replacing the screws by other fixing members. These fixing members are typically secured to the side mounting holes of the data storage device on one end, while secured to the computer housing on the other end. However, these fixing members still have room for improvement. For example, when metal strips are inserted into the mounting holes, the fastening performance and stability are less effective than screws. When the disc is spun by the optical disc drive, noise due to vibration may be generated. Alternative fixing members are made by sheet-metal manufacturing process such as stamping, where the fixing members tend to have complex structures with high manufacturing cost. The existing fixing members also tend to be quite thick, which increases the overall size thereof

SUMMARY OF THE INVENTION

A retaining mechanism for data storage device is provided, which can allow easy installation of the data storage device and enhance the fastening performance and stability.

This invention also provides a retaining mechanism for data storage device, where the retaining mechanism has a simple structure in reducing manufacturing cost and occupies less space.

According to an aspect of this invention, a retaining mechanism is provided and is adapted for securing to corresponding mounting hole formed in the data storage device. The retaining mechanism of the instant disclosure includes a securing structure and a retainer. The securing structure includes a wall body having an accommodating hole formed thereon. A pair of elastic arms is extended integrally from the inner surfaces of the accommodating hole. Each elastic arm has a fixed end merged to the corresponding inner surface of the accommodating hole and a free end projecting downward in a sloped fashion. One end of the retainer is secured to the mounting hole of the data storage device, while the other end thereof is mounted to the securing structure.

According to one embodiment of the present invention, the retaining mechanism can be applied in a snap-in bracket for securing a data storage device having a plurality of mounting holes formed on side surfaces thereof The snap-in bracket includes a base wall, a pair of side walls connected to both sides of the base wall, and a plurality of retainers. Each side wall has at least one securing structure. Each securing structure has an accommodating hole formed through the side wall and a pair of elastic arms extended from the side wall into the accommodating hole. Each elastic arm has a fixing end connected to an inner edge around the accommodating hole, and a free end extending slantingly downward into the accommodating hole. Each retainer has a front portion engaged in the mounting hole of the data storage device, a middle portion connected with the front portion, and a rear portion blocked at one side of the side board. The middle portion is pressed by the pair of elastic arms and fixed in the accommodating hole.

According to one embodiment of the present invention, the retaining mechanism can be applied in a frame for securing a data storage device having a plurality of mounting holes formed on side surfaces thereof The frame includes a top wall, a bottom wall and a pair of side walls respectively connected to both sides of the top wall and the bottom wall, and a plurality of retainers. Each side wall has at least one securing structure. Each securing structure includes an accommodating hole formed through the side wall, and a pair of elastic arms extended from the side wall into the accommodating hole. Each elastic arm has a fixing end connected to an inner edge around the accommodating hole, and a free end extending slantingly downward into the accommodating hole. Each retainer has a front portion engaged in the mounting hole of the data storage device, a middle portion connected with the front portion, and a rear portion blocked at one side of the side board. The middle portion is pressed by the pair of elastic arms and fixed in the accommodating hole.

The effect of this invention is that, the retaining mechanism of the instant disclosure has the following advantages. The securing structure and the retainer are easy to make structurally with low manufacturing cost. The securing structure can be formed integrally with the snap-in bracket or the frame to reduce overall thickness. The installation process of the data storage device can be easily accomplished in a screw-less manner, and the installed device is tightly held in place.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF PREFERRED EMBODIMENTS

To obtain further understanding regarding the objective, structural descriptions, technical features, and functions of the instant disclosure, please refer to the descriptions given hereinbelow.

Figure 1:
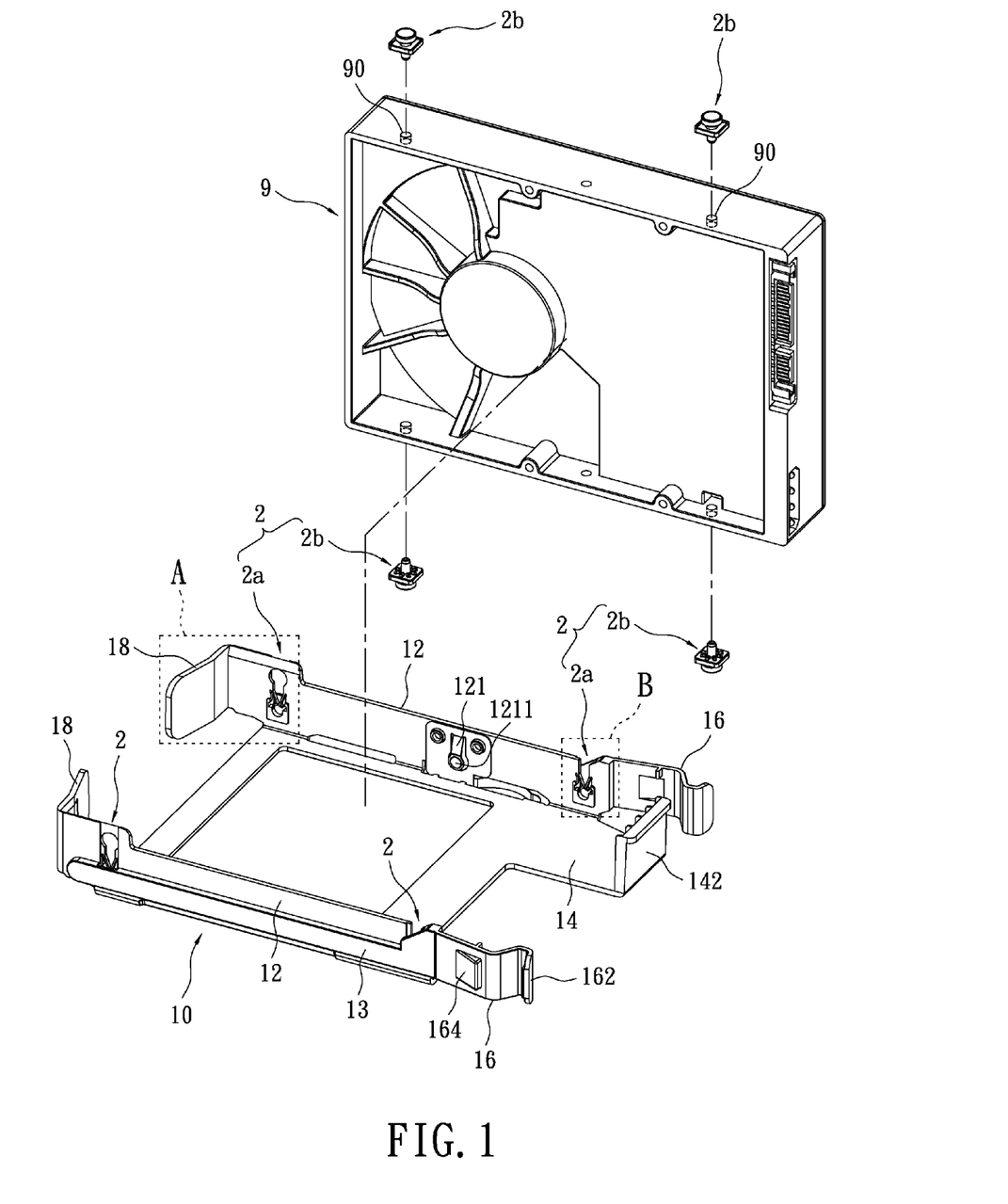
FIG. 1 is a perspective view of a snap-in bracket having a plurality of retaining mechanisms for securing a data storage device according to this invention.

Referring to FIG. 1, which is a perspective view of a snap-in bracket having a plurality of retaining mechanisms for securing a data storage device according to this invention. For the instant embodiment, a snap-in bracket 10 is provided and a plurality of retaining mechanisms 2 is arranged in the snap-in bracket 10. These retaining mechanisms 2 are used to secure a data storage device 9 which has a plurality of mounting holes 90 formed on side surfaces thereof The data storage device 9 may be an optical disc drive, a hard disc drive, a floppy disc drive, etc. In the following descriptions, take the snap-in bracket 10 as an example to discuss how the retaining mechanisms 2 secure the data storage device 9.

The snap-in bracket 10 includes a pair of opposing side walls 12 and a base wall 14 connected to the pair of side walls 12. Each side wall 12 has one end connected to a latching member 16 and another end connected to a abutting member 18. The latching member 16 has a holding portion 162 and a hooking portion 164 formed thereon. A blocking portion 142 is extended upward from one side of the base wall 14 and arranged between the latching members 16. The side walls 12, the abutting members 18, and the blocking portion 142 abut against the four sides of the data storage device 9 surroundingly to prevent it from shaking loosely in the snap-in bracket 10. The inner surface of each side wall 12 has an elastic strip 121 arranged on a central portion thereof The elastic strip 121 has a free end protruded a bulge 1211 for securing to the corresponding mounting hole 90 formed on the central region of the side portion of the data storage device 9. After the data storage device 9 has been secured within the snap-in bracket 10, the assembled unit is then inserted into a mounting seat of computer (not shown). The assembled unit is secured within the mounting seat through the aforementioned hooking portions 164. Such installation technique of the data storage device 9 is screw-less and simplifies the installation/dismount process.

The retaining mechanism 2 includes a securing structure 2a and a retainer 2b. For the instant embodiment, two securing structures 2a are formed integrally with each side wall 12. The securing structures 2a are formed on the side wall 12, and the retainer 2b is interconnected between the data storage device 9 and the securing structure 2a.

Figure 2:
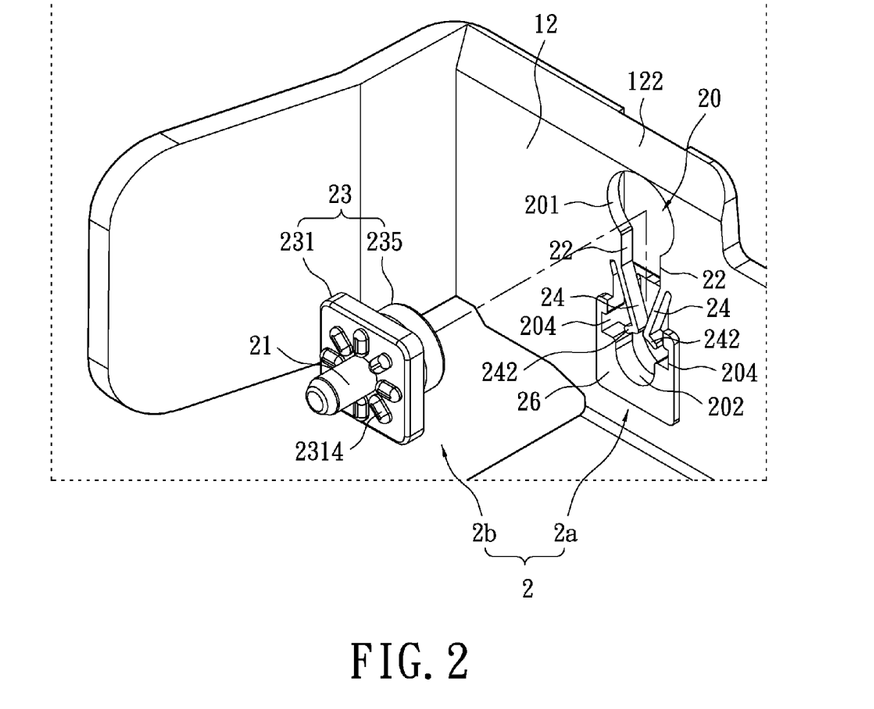
FIG. 2 is an enlarged view of section A in FIG. 1.

Referring to FIG. 2, which shows an enlarged view of section A in FIG. 1. The securing structure 2a includes a wall body, an accommodating hole 20 formed through the wall body, and a pair of elastic arms 24. The pair of elastic arms 24 extends from the wall body into the accommodating hole 20. For the instant embodiment, the securing structure 2a is formed on the side wall 12. Therefore, the aforementioned wall body can be treated or defined as a portion of the side wall 12. For hereinafter, the wall body is represented by the numeral 12. A locating seat 26 is formed protrudingly on the wall body 12 around the lower portion of the accommodating hole 20 for securing the retainer 2b.

The accommodating hole 20 is formed in an upright orientation and bounded by the wall body 12. In particular, the accommodating hole 20 is defined by an upper opening 201 and a lower opening 202. Each elastic arm 24 has a fixed end connected to an inner edge defined the accommodating hole 20 and a free end extending from the fixed end downward and obliquely. The free end of each elastic arm 24 is further bent in forming an abutting portion 242, which is for abutting against the retainer 2b. In corresponding to the abutting portions 242, a pair of grooves 204 is concaved oppositely on the inner surfaces of the accommodating hole 20. The grooves 204 are used to selectively receive the abutting portions 242.

Figure 3:
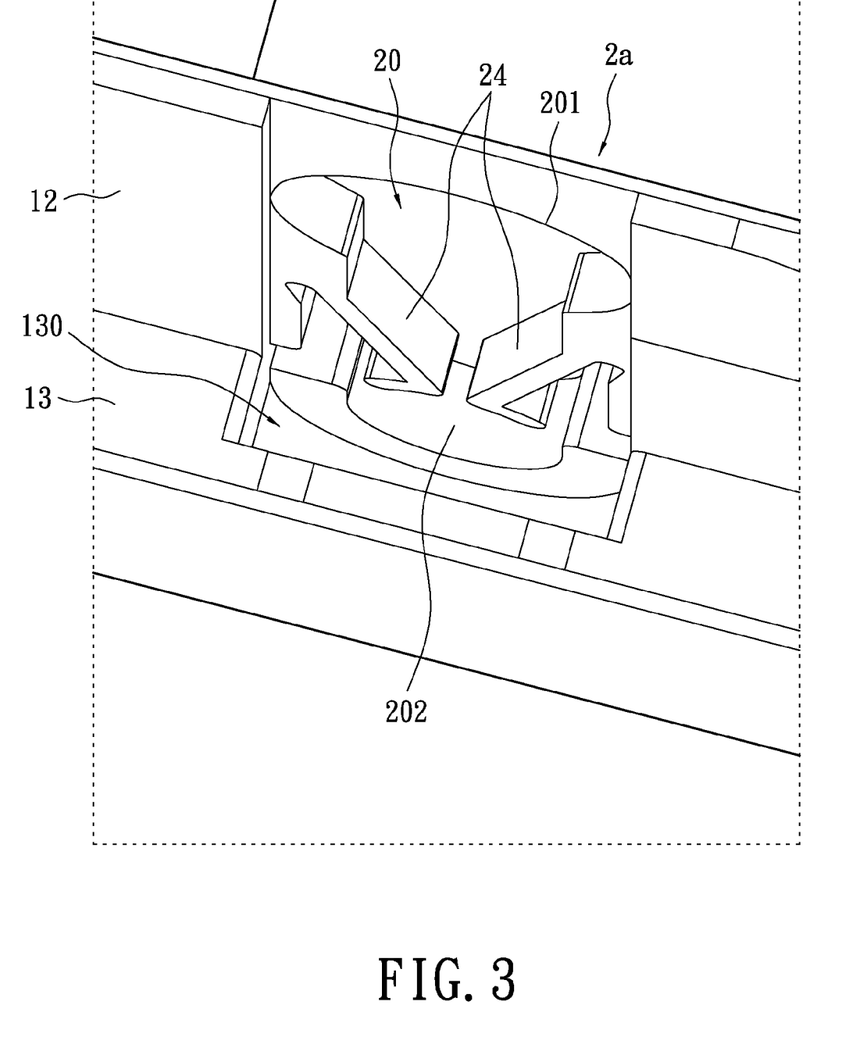
FIG. 3 is another perspective view of a securing structure of the retaining mechanism of the preferred embodiment, viewed from a different angle.

Referring to FIG. 3, which shows a perspective view of the securing structure 2a taken from another angle. For the instant disclosure, the securing structure 2a further includes a peripheral wall 13 formed at an outer side of the wall body 12. Near the lower opening 202 of the accommodating hole 20, a receiving space 130 is defined between the peripheral wall 13 and the wall body 12 for accommodating one end of the retainer 2b.

Please refer back to FIG. 2. More detailed descriptions of the retainer 2b will be given later. Generally, the retainer 2b can be defined as having a front portion and a rear portion. The front portion is outlined by the numeral 23, while the rear portion is outlined by the numeral 21. The rear portion of the retainer 2b can be inserted and secured to the corresponding mounting hole 90 of the data storage device 9. Whereas the front portion of the retainer 2b is held pressingly by the elastic arms 24 and secured to the securing structure 2a.

The retaining mechanism 2 for data storage device of the instant disclosure is generally used in the following way, with more detailed descriptions to be given later. First, the front portion of the retainer 2b is inserted into the accommodating hole 20 of the securing structure 2a. Then, the retainer 2b is slid downward while pushing the elastic arms 24 apart, with the abutting portions 242 being received in the grooves 204. After the front portion of the retainer 2b has reached the lower opening 202 of the accommodating hole 20, the elastic arms 24 would return to its original undeformed positions by elasticity and pressing on the retainer 2b. Thereby, the retainer 2b is secured to the securing structure 2a.

Figure 2A:
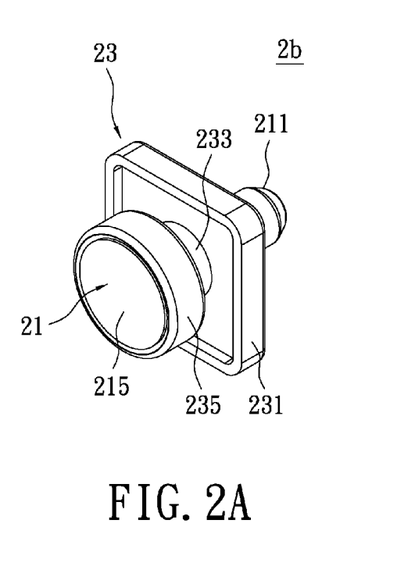
FIG. 2A is an assembled view of a retainer of the retaining mechanism of the preferred embodiment.
Figure 2B:
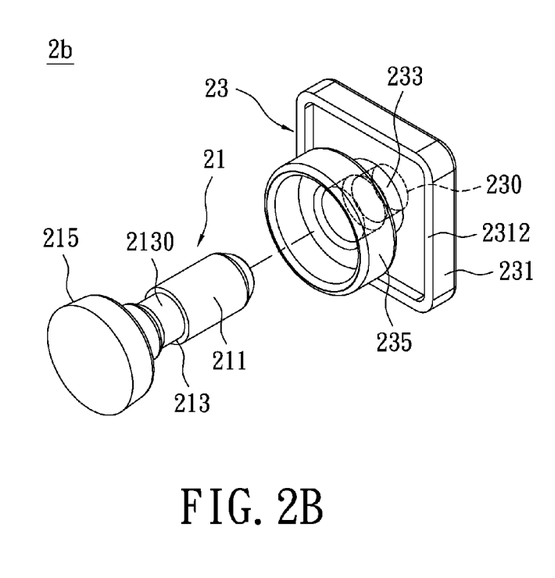
FIG. 2B is an exploded view of FIG. 2A.

Referring to FIGS. 2A and 2B, which show an exploded view and an assembled view of the retainer 2b, respectively. The retainer 2b includes an inner plug 21 and a sleeve member 23 that partially fits over the inner plug 21. The inner plug 21 is preferably made of metal material to increase its overall rigidity. Whereas the sleeve member 23 is preferably made of elastic material, such as plastic or rubber, to provide damping and increase friction and fastening ability. However, the present invention is not restricted to above configuration. For example, the retainer 2b may be integrally formed into one piece, instead of a two-piece unit. One possible configuration is making the retainer 2b entirely of hard plastic material. An alternative choice is making the inner plug 21 out of hard plastic material and the sleeve member 23 with soft plastic material, where co-injection molding technique is employed to perform the manufacturing process.

The inner plug 21 has a disc-shaped head portion 215, a rod-like inserting portion 211, and a neck portion 213 connected between the head portion 215 and the inserting portion 211. A mating portion 2130 is formed concavely on the neck portion 213. The exposed portion of the inner plug 21, i.e., the inserting portion 211, is engaged to the corresponding mounting hole 90 of the data storage device 9.

The sleeve member 23 includes a buffering piece 231 that can be arranged between the wall body 12 and the data storage device 9. A lip portion 2312 is protruded from the outer edge of the buffering piece 231 surroundingly toward the locating seat 26 for establishing secure pressing contact with the wall body 12. For the instant embodiment, the locating seat 26 is square-shaped, such that the frame-liked lip portion 2312 is formed matchingly to provide a snug fit in mating the sleeve member 23 onto the wall body 12 and prevent relative rotational movement there-between. In addition, as shown in FIG. 2, a plurality of protrusions 2314 is formed on a side of the buffering piece 231 facing the data storage device. Upon assembly, these protrusions 2314 may create buffering/cushioning effect and provide additional shock absorbing capability.

Compared to conventional retaining screws, the rear portion of the retainer 2b is substantially equal in size with the threaded portion of the screw. Whereas the rear portion does not need to be threaded. The front portion of the retainer 2b is slightly thicker than the screw due to the buffering piece 231. Generally speaking, the overall size of the retainer 2b is not much different from a conventional retaining screw.

Please refer back to FIG. 2B, where a center hole 230 is formed on a central portion of the sleeve member 23. The inner surface of the center hole 230 is engaged to the mating portion 2130 of the inner plug 21. Thus, the inner plug 21 can be secured tightly to the sleeve member 23. The sleeve member 23 further has a retaining cap 235 for receiving the head portion 215 and a collar portion 233 arranged between the buffering piece 231 and the retaining cap 235. The collar portion 233 is fitted over the neck portion 213 of the inner plug 21. The elastic arms 24 are arranged between the retaining cap 235 and the buffering piece 231 and pressing on the collar portion 233 of the sleeve member 23.

Figure 4:
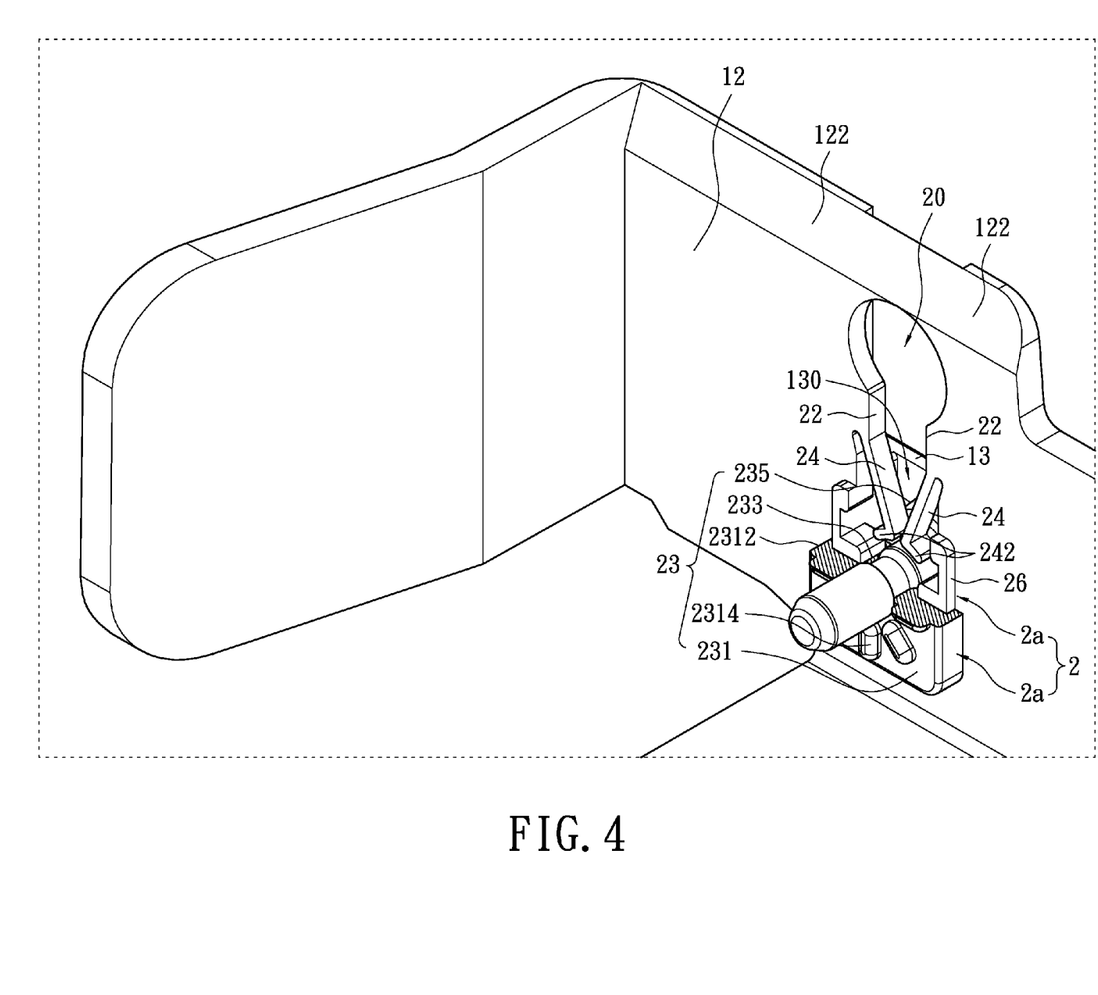
FIG. 4 is an assembled view of the retaining mechanism for data storage device according to the first embodiment of the present invention.
Figure 4A:
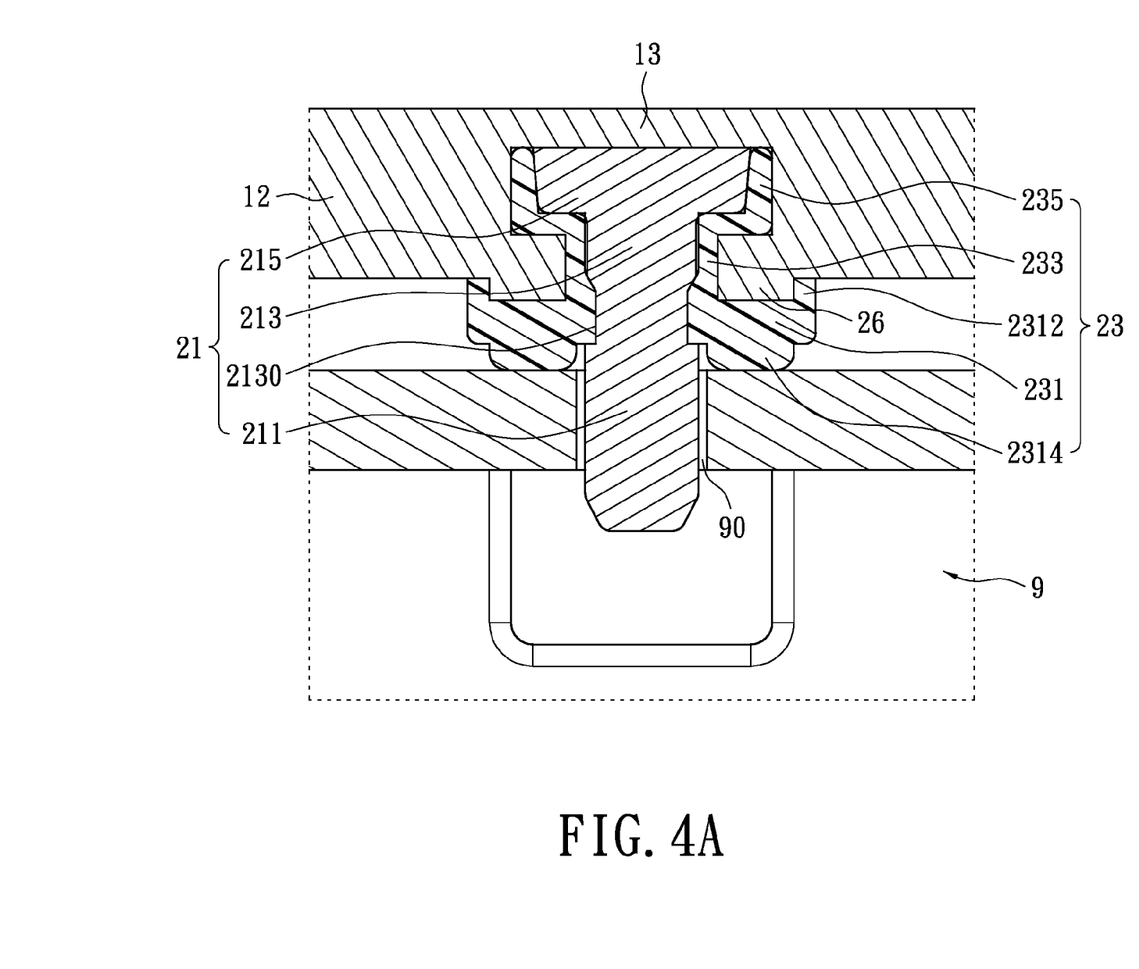
FIG. 4A is a sectional view of the retaining mechanism along a cutting plane of the instant disclosure.

Referring to FIGS. 4 and 4A. FIG. 4 shows an assembled view of the retaining mechanism 2 and a sectional view of the retainer 2b, particularly the sleeve member 23, of the instant disclosure. For the instant embodiment, the upper opening 201 of the accommodating hole 20 is contoured to match in shape with the retaining cap 235 of the sleeve member 23.

When installing the data storage device 9, the rear portion of the retainer 2b, i.e., the inserting portion 211, is inserted into and engaged with the corresponding mounting hole 90 of the data storage device 9. After all of the retainers 2b have been secured to the data storage device 9, the data storage device 9 is ready to be disposed on the snap-in bracket 10. When disposing the data storage device 9 onto the snap-in bracket 10, the front portion of each retainer 2b, i.e., the retaining cap 235 of the sleeve member 23, is slid along a slanted surface 122 of the corresponding wall body 12 in a downward direction. The wall bodies 12 are slightly flexed outwardly by the retainers 2b until the retaining cap 235 is fitted through the upper opening 201. Next, the retainer 2b, particularly the collar section 233, is slid down the accommodating hole 20, and the elastic arms 24 are push outside. For the instant embodiment, a section of the accommodating hole 20 is defined by two opposing parallel inner surfaces 22 formed above the elastic arms 24. The distance between the parallel inner surfaces 22 is generally the same as the width of the collar portion 233 of the sleeve member 23.

Once each retainer 2b has been slid down the corresponding accommodating hole 20, the collar portion 233 is arranged in the lower opening 202. The elastic arms 24 return to its original undeformed positions, where the abutting portions 242 press downward on the collar portion 233 of the sleeve member 23. The retaining cap 235 of each sleeve member 23 is accommodated by the corresponding receiving space 130 between the wall body 12 and the peripheral wall 13. The buffering piece 231 of each retainer 2b is seated onto the corresponding locating seat 26. Thus, the data storage device 9 has been securely installed onto the snap-in bracket 10.

Figure 5:
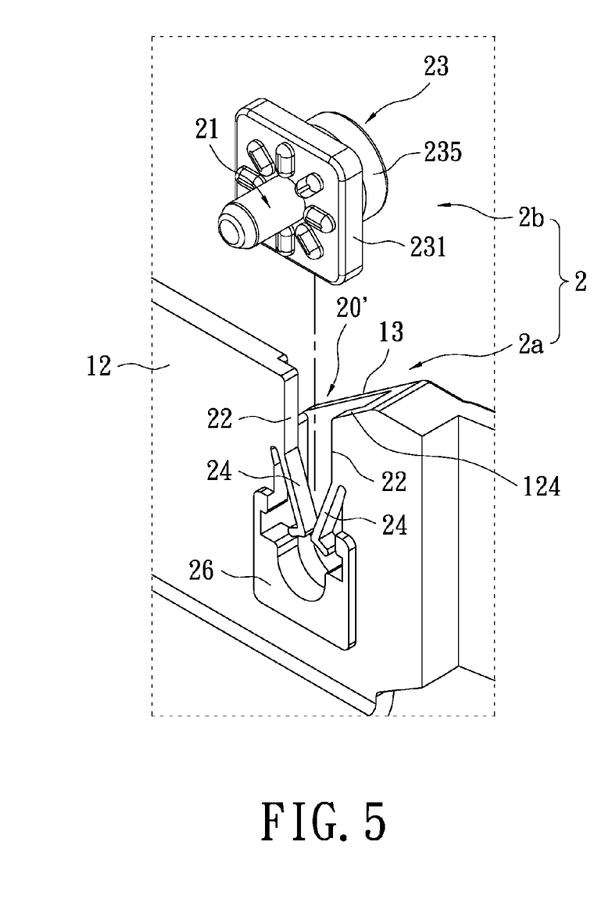
FIG. 5 is an enlarged view of section B in FIG. 1 showing the retaining mechanism for data storage device according to the second embodiment of the present invention.
Figure 6:
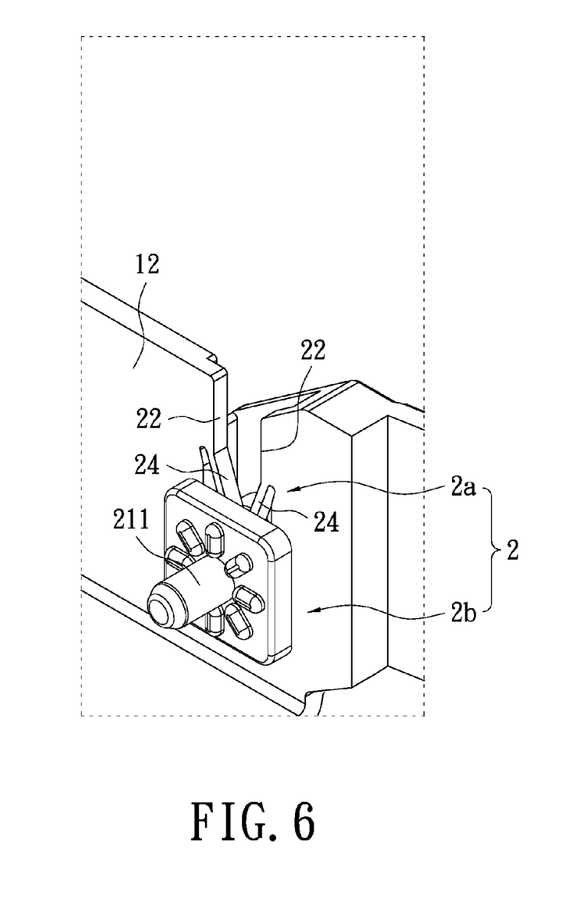
FIG. 6 is an assembled view of FIG. 5.

Referring to FIGS. 5 and 6, which are enlarged views of section B in FIG. 1. Both figures also illustrate the retaining mechanism 2 for data storage device for a second embodiment of the instant disclosure. The second embodiment differs from the previous embodiment by: the accommodating hole 20' is open to the upper edge of the wall body 12. Whereas like the previous embodiment, the accommodating hole 20' is partially defined by two parallel inner surfaces 22. The parallel inner surfaces 22 are formed above the elastic arms 24, and the distance between the parallel inner surfaces 22 is substantially the same as the width of the collar portion 233 of the sleeve member 23. In addition, for the instant embodiment, a sloped surface 124 is formed on the upper edge of the wall body 12, where the sloped surface 124 is adjacent to one side of the accommodating hole 20' and one of the parallel inner surfaces 22.

Figure 7:
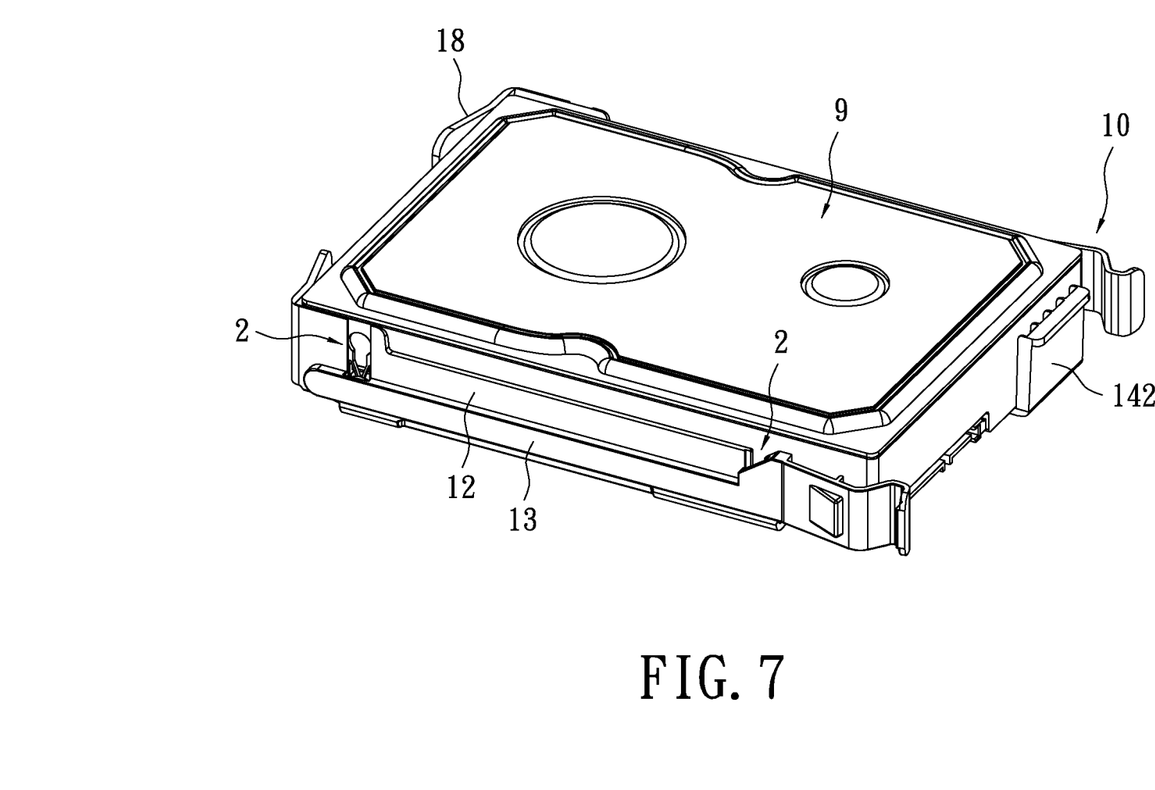
FIG. 7 is a perspective view showing the data storage device installed in the snap-in bracket of the present invention.

Please refer to FIG. 7, which shows a perspective view of the data storage device 9 held by the snap-in bracket 10 using the retaining mechanisms 2. The peripheral wall 13 can also be configured as a rail member for the snap-in bracket 10. Such configuration would enable the snap-in bracket 10 to be slidably inserted into a standard PC case drive bay (not shown).

Figure 8:
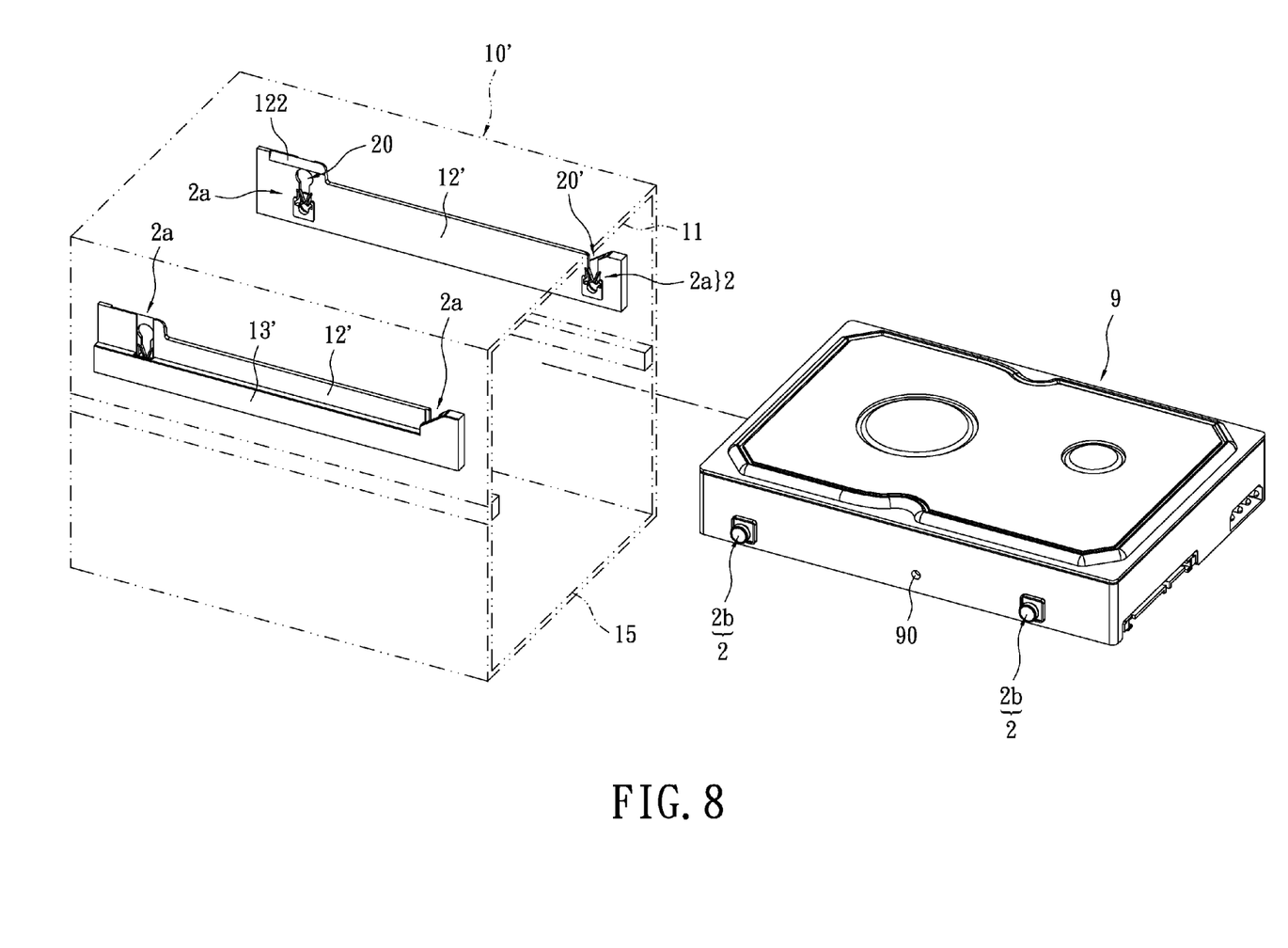
FIG. 8 is a perspective view of a frame having the retaining mechanisms for securing the data storage device of the present invention.

Referring to FIG. 8, which shows a perspective view of a frame 10' using the retaining mechanisms 2. The frame 10' includes a top wall 11, a bottom wall 15, a pair of side walls 12', and retainers 2b. The side walls 12' of the frame 10' can act as the wall bodies of the retaining mechanisms 2. In other words, multiple securing structures 2a can be formed integrally on each side wall 12' of the frame 10'. Each securing structure 2a includes aforementioned technical features, which will not be repeated herein. One end of each retainer 2b is secured to the respective mounting hole 90 of the data storage device 9, while the other end of each retainer 2b is secured to the corresponding securing structure 2a. Each securing structure 2a can be configured with close-ended accommodating hole 20 or open-ended accommodating hole 20'. All of the securing structures 2a can have open-ended accommodating holes 20' formed thereon to provide quick connection with the retainers 2b.

Based on the above, the retaining mechanism 2 for data storage device of the instant disclosure has at least following advantages.

1. The retaining mechanism 2 is structurally simple, where the securing structure 2a can be made of plastic and the retainer 2b can be easily made to reduce production cost.

2. The securing structures 2a can be formed integrally with the side walls 12 of the snap-in bracket 10 or with the side walls 12' of the frame 10'. Each exposed portion of the retainers 2b secured to the data storage device 9 has substantially the same size as a conventional screw, such that the thickness of the retaining mechanism 2 can be reduced.

3. The retaining mechanism 2 is structurally well-supported, where the data storage device 9 can be easily secured to the securing structures 2a by the retainers 2b in a screw-less fashion firmly.

In particular, each retainer 2b is securely arranged in the lower opening 202 by the elastic arms 24 pressing downwardly, so that the retainers 2b will not move in a vertical or horizontal directions.

Whereas in the direction normal to the vertical wall body 12, the front portion of each retainer 2b, i.e., the retaining cap 235 of the sleeve member 23 and the head portion 215 of the inner plug 21, is secured in the receiving space 130 formed between the wall body 12 and the peripheral wall 13. Moreover, the buffering piece 231 of the sleeve member 23 is secured to the locating seat 26 to reinforce the fastening effect. Thereby, the data storage device 9 can be secured firmly onto the snap-in bracket 10.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A retaining mechanism adapted for securing a data storage device having sides formed with a plurality of mounting holes, said retaining mechanism comprising:
   a securing structure including a wall body having two opposing parallel inner surfaces and a lower-opening portion to define a accommodating hole therebetween and a pair of elastic arms arranged in the accommodating hole substantially in V-shaped, wherein said wall body is formed with a pair of grooves respectively concaved on the two inner surfaces adjacent to the lower-opening portion, wherein each of said elastic arms has a fixed end and a free end, said fixed end of each of said elastic arms connects the respective inner surface of the wall body, said free end extending slantingly downward into the accommodating hole forming an abutting portion pointing toward said groove;
   a retainer having one end engaging one of the mounting holes in the storage device and the other end received in the lower-opening portion pressed by the abutting portions of the free ends of the elastic arms, so as to be secured in the securing structure; and
   wherein as the retainer is installing into the lower-opening portion, the abutting portion is selectively biased into the grooves.

2. The retaining mechanism as claimed in claim 1, wherein the securing structure further includes a peripheral wall arranged adjacently to the outer surface of the wall body in forming a receiving space to accommodate one end of the retainer.

3. The retaining mechanism as claimed in claim 1, wherein the retainer includes an inner plug and a sleeve member fits partially on the inner plug, wherein the exposed portion of the inner plug is secured to the corresponding mounting hole of the data storage device, and wherein the sleeve member has a buffering piece arranged between the wall body and the data storage device.

4. The retaining mechanism as claimed in claim 3, wherein a locating seat is formed protrudingly on the wall body substantially around the grooves and the lower-opening portion, and wherein a lip portion is formed protrudingly on the edge portion of the buffering piece for securing to the locating seat matchingly.

5. The retaining mechanism as claimed in claim 3, wherein a plurality of protrusions is formed on the buffering piece facing toward the data storage device.

6. The retaining mechanism as claimed in claim 3, wherein a mating portion is formed concavedly on the inner plug, wherein a center hole is projected centrally on the sleeve member, and wherein the inner surface of the center hole is engaged to the mating portion.

7. The retaining mechanism as claimed in claim 3, wherein the inner plug has a disc-shaped head portion received by a retaining cap formed on the sleeve member, and wherein a collar portion is formed on the sleeve member between the buffering piece and the retaining cap.

8. The retaining mechanism as claimed in claim 7, wherein the elastic arms are rested between the buffering piece and the retaining cap.

9. The retaining mechanism as claimed in claim 7, wherein the accommodating hole is bounded by the wall body and shaped matchingly to the retaining cap of the sleeve member.

10. The retaining mechanism as claimed in claim 7, wherein the accommodating hole has a pair of parallel inner surfaces formed above the elastic arms, and wherein the distance between the parallel inner surfaces is substantially the same as the width of the collar portion of the sleeve member.

11. The retaining mechanism as claimed in claim 7, wherein the accommodating hole is open to the upper edge portion of the wall body and having a pair of parallel inner surfaces formed above the elastic arms, and wherein the distance between the parallel inner surfaces is substantially the same as the width of the collar portion of the sleeve member.

12. The retaining mechanism as claimed in claim 11, wherein a slopped surface is formed on the upper edge portion of the wall body adjacent to one of the parallel inner surfaces of the accommodating hole.

13. The retaining mechanism as claimed in claim 1, wherein the securing structure is formed on a side wall of a snap-in bracket, wherein the wall body is a portion of the side wall.

14. The retaining mechanism as claimed in claim 13, wherein each side wall has a pair of securing structures and a pair of retainers.

15. The retaining mechanism as claimed in claim 1, wherein the securing structure is formed on a side wall of a frame, wherein the wall body is a portion of the side wall.

16. The retaining mechanism as claimed in claim 15, wherein each side wall has a pair of securing structures and a pair of retainers.

* * * * *